United States Patent [19]

McFall

[11] Patent Number: 4,484,245
[45] Date of Patent: Nov. 20, 1984

[54] DIRECTIONAL COMPARISON BLOCKING PROTECTIVE RELAY SYSTEM

[75] Inventor: John D. McFall, Auburn Township, Cuyahoga County, Ohio

[73] Assignee: Westinghouse Electric Corp., Pittsburgh, Pa.

[21] Appl. No.: 505,163

[22] Filed: Jun. 17, 1983

[51] Int. Cl.³ .............................................. H02H 3/30
[52] U.S. Cl. ...................................... 361/68; 361/80; 361/82; 361/64
[58] Field of Search ........................ 361/68, 67, 69, 81, 361/80, 82, 83, 84, 85, 62, 64, 66; 340/310 R, 310 A

[56] References Cited

U.S. PATENT DOCUMENTS

| | | | |
|---|---|---|---|
| 2,879,454 | 3/1959 | Hodges et al. | 361/68 |
| 3,312,866 | 4/1967 | Rockefeller, Jr. | 361/68 |
| 3,337,774 | 8/1967 | Rockefeller, Jr. | 361/81 |

Primary Examiner—Patrick R. Salce
Attorney, Agent, or Firm—D. R. Lackey

[57] ABSTRACT

A protective relay system for opening local and remote circuit breakers of a protected line segment when a fault occurs thereon. The protective relay system includes local and remote fault detectors for producing local and remote blocking carrier signals, respectively, for transmission to the other terminal when a fault is in the forward direction from the terminal. Reception of a blocking signal blocks tripping of the circuit breaker at the receiving terminal. When the fault is internal, the blocking signals are transmitted for only a short duration, sufficient to allow the protective relays at both terminals to detect the internal fault. When transmission of the blocking signals stops, the trip coils at both terminals are energized because the relays at both terminals see the fault in the forward direction and do not receive the blocking signal. For an external fault the relays at the terminal from which the fault is seen in the forward direction transmit a blocking signal to the other terminal. At the latter terminal the blocking signal is received and causes transmission of a longer duration blocking signal to the transmitting terminal. The receivers at both terminals are responsive to the longer duration blocking signal to block tripping. The duration of this longer duration blocking signal is established so that the external fault is cleared by other protective relays before transmission of the longer-duration blocking signal terminates, thereby preventing tripping at the terminal where the fault was originally detected in the forward direction.

17 Claims, 2 Drawing Figures

DIRECTIONAL COMPARISON BLOCKING PROTECTIVE RELAY SYSTEM

BACKGROUND OF THE INVENTION

1. Field of the Invention

This invention relates generally to protective relays, and more specifically to protective relays employing a directional comparison blocking scheme.

2. Description of the Prior Art

Electrical transmission lines and power generating equipment must be protected against insulation faults and consequent short circuits that could cause collapse of the power system, serious and expensive apparatus damage, and personal injury. For instance, such a fault is caused by lightning-induced flashover from a transmission line to ground or between adjacent transmission line conductors. Under such a fault condition, line currents can increase to several times the normal value, thereby causing loss of synchronism among generators and damaging or destroying both the transmission line and the attached equipment. To avoid equipment damage and collapse of the entire power system, faulted apparatus on the main transmission line must be isolated from the network in the range of approximately 0.1 to 0.5 seconds. The isolation time limit must allow for the operation of large circuit breakers, interrupting up to 80,000 A, and completion of back-up operations if these primary protective devices fail to function properly. To allow sufficient time for circuit interruption, location of the fault must be determined in approximately 8 ms to 20 ms. It is the function of the protective relays, which monitor ac voltages and currents, to locate line faults and initiate isolation via tripping of the appropriate circuit breakers. These faults are located by determining the relationship of the ac voltages and currents.

One type of protective relay system for transmission lines employs a protective relay apparatus at each transmission line terminal. Analyzing the ac voltages and currents, each protective relay operates independently to determine if a fault has occurred on the intervening protected line segment. This type of protective relay system usually provides high-speed simultaneous protection for only 70% to 80% of the faults in the middle section of the protected line segment. For faults occurring near the ends of the line, the protective relay nearest the fault clears the line at high speed. The relay remote from the fault, however, clears the line with a time delay unless system conditions provide high-speed sequential tripping.

In another type of protective relay system, known as pilot relaying, the protective relays at each end of the transmission line communicate with each other via a bidirectional communications link. The relays at each line terminal compare fault location information to quickly determine if the fault is on the intervening line segment. If the comparison indicates that the detected fault is internal, i.e., between the two protective relays, the intervening transmission-line section is isolated by tripping the circuit breakers at the line terminals. If the comparison indicates the fault is not between the two protective relays, the circuit breakers remain closed and the line operative. Pilot protection provides high speed protection for 100% of the protected line independent of system conditions. The communications channel linking the two relays can employ a modulated carrier signal transmitted over a power line phase conductor or over a microwave system, or audio tones propagated on a leased telephone line or on a dedicated pilot wire.

There are several advantages to high-speed simultaneous clearing at all terminals for all line faults, including: reduced possibility of line damage and conductor burndown; improved transient stability of the power system, and provisions for the use of high-speed reclosing, which if successful, improves transient stability, minimizes outage time, and improves voltage conditions on portions of the system load.

There are many different types of pilot relaying systems; the present invention includes features of a blocking pilot relaying system. In the traditional blocking system, the communications channel linking the protective relays at opposite ends of the protected line segment is used only to prevent one or more of those protective relays from tripping on an external fault. A channel signal is not required for internal faults, i.e., tripping occurs in the absence of a channel signal. When a channel signal is present, the protective relays are blocked from tripping.

To detect a fault with a pilot relaying system, either directional comparison relays or phase comparison relays are used at each terminal. In the directional comparison scheme, fault detecting relays compare the direction of power flow at the two line terminals. Power flow into the line at both terminals indicates an internal fault and the circuit breakers at each terminal of the line are tripped. If the power flows into the line at one terminal and out of the other, the fault is external and the line remains in service.

More specifically, the prior art directional comparison blocking scheme employs four relays at each line terminal to detect phase and ground faults and their direction with respect to the relays' location. One of these relays is a phase forward-reaching tripping relay and another is a ground forward-reaching tripping relay (designated 21P and 21NP, respectively). One or both of these relays is responsive to all faults on the protected line segment between the line terminals. The other two relays, for monitoring that portion of the line behind the terminal, are a reverse-reaching phase relay and a nondirectional ground overcurrent relay (designated 21S and Ios, respectively).

In a directional comparison blocking system, if fault current flows into both transmission line terminals simultaneously, no blocking carrier is transmitted and high speed tripping of the breakers occurs at both terminals of the faulted line. For external faults, at one terminal neither the phase nor the ground directional distance relays detect the fault. This prevent tripping at that terminal and transmits a blocking carrier signal to the other terminal. Note that the relays at the latter terminal detect the fault, but upon receipt of the blocking carrier signal these relays are blocked from tripping. Transmission of the blocking carrier signal is initiated by the reverse-reaching phase relay and/or the nondirectional ground overcurrent relay, which are set to reach beyond the tripping relays located at the other terminal.

The feature that distinguishes the directional comparison blocking system from other pilot relaying systems is that the carrier is normally off, and that a sustained blocking signal is transmitted upon the occurrence of an external fault. The fundamental concept of this prior art system is that tripping occurs if either of the directional tripping relays operate and a carrier signal is not received. The prior art directional-comparison blocking scheme is widely used due to its flexibility and reliability. Since the communications channel is not required for tripping, internal faults that might short and interrupt the channel are not a problem. Overtripping occurs, however, if the channel fails or blocking is not established for external faults within the reach of the tripping relays. Since the carrier transmitter is normally off, channel failure cannot be detected until the system is tested or an external fault occurs.

The phase comparison blocking scheme generally uses overcurrent fault detecting relays to compare, via the channel, the relative phase of the currents at the terminals. In one such prior art arrangement, if the currents at the terminals are relatively in-phase an internal fault is indicated, blocking carrier is not transmitted during the negative half-cycle of the ac signal, and the circuit breakers at both terminals of the line are tripped. If the currents at the terminals are relatively 180° out-of-phase, an external fault (or through load current) is indicated and the breakers are not tripped.

Another prior art directional comparison pilot scheme developed to overcome some of the disadvantages of the directional comparison blocking system is a directional comparison unblocking system. The directional comparison unblocking system transmits a continuous blocking signal except during an internal fault. Only two relays are required at each line terminal, a forward reaching phase relay and a forward-reaching ground relay. The communications signal between the line terminals is usually a phase shifted power-line carrier. A blocking (guard) signal is transmitted continuously during normal conditions. For an internal fault the phase-shifted carrier transmitter is shifted to the unblocking or trip frequency, thus tripping circuit breakers at both terminals of the protected line segment.

Like the directional comparison unblocking system, the prior art overreaching transfer-trip system also uses two protective relays at each line terminal; both are forward-reaching distance relays set to overreach the other line terminal. Usually a phase shifted audio tone modulated on a communications channel (microwave or telephone lines) is used with the overreaching transfer-trip system. The relay seeing an external fault transmits a trip signal to the other terminal, but since the latter does not see the fault no trip occurs. For an internal fault the relays at both terminals see the fault, and transmit the corresponding trip signal to the other terminal, thereby tripping the protected line segment. Because transmission of a signal is required to trip, dependability of the overreaching transfer-trip systems is less than that of a prior art blocking system.

SUMMARY OF THE INVENTION

The directional comparison blocking scheme of the present invention includes features of the blocking, unblocking, and transfer trip systems. Only two fault detecting relays are required at each terminal: a forward-reaching phase distance relay and a forward-reaching ground distance relay (or a directional ground overcurrent relay). In the system of the present invention when a phase or ground fault-detecting relay operates, it keys the transmitter to notify the other terminal that a fault has occurred in the direction of the protected line segment. Instead of a frequency shift scheme as used by the unblocking and transfer trip systems, the present invention uses an on-off carrier. Note that receipt of the carrier permits tripping in the transfer trip and unblocking systems and blocks tripping in the blocking system. In the present invention receipt of the carrier signal also blocks tripping, but fewer relays are required at each line terminal than in the prior art blocking system.

In the novel blocking system of the present invention, if either the forward-reaching phase relay or the forward-reaching ground relay at a local terminal of the protected line segment sees a fault, the transmitter keys on for a short time. When the transmitter goes off, a determination is made at the local terminal regarding whether carrier is being received from the remote terminal. If no carrier is being received, the fault is internal and the local circuit breaker trips. The forward-reaching phase relay and the forward-reaching ground relay at the remote terminal function in an identical manner.

Assuming the fault is external and beyond the remote terminal, either the phase or ground relay at the local line terminal sees the fault and transmits the blocking carrier signal. The blocking carrier signal is received at the remote end, and since the fault is not seen from this terminal, receipt of the carrier signal keys the remote transmitter on. Under these conditions (i.e. receiving carrier and not detecting the fault) carrier transmission from the remote end continues after transmission from the local end has stopped. Since the forward-reaching protective relays at the remote terminal do not see the fault, the fault must be external, and transmission of the carrier from the remote terminal blocks tripping of the circuit breakers at the local and remote terminals. Thus, the carrier signal in the instant invention performs two functions: it blocks tripping and aids the receiving terminal in determining the direction to the fault. Note the transmission of the first blocking signal (i.e., by the relay that sees the external fault) is accomplished by a tripping relay.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 1:
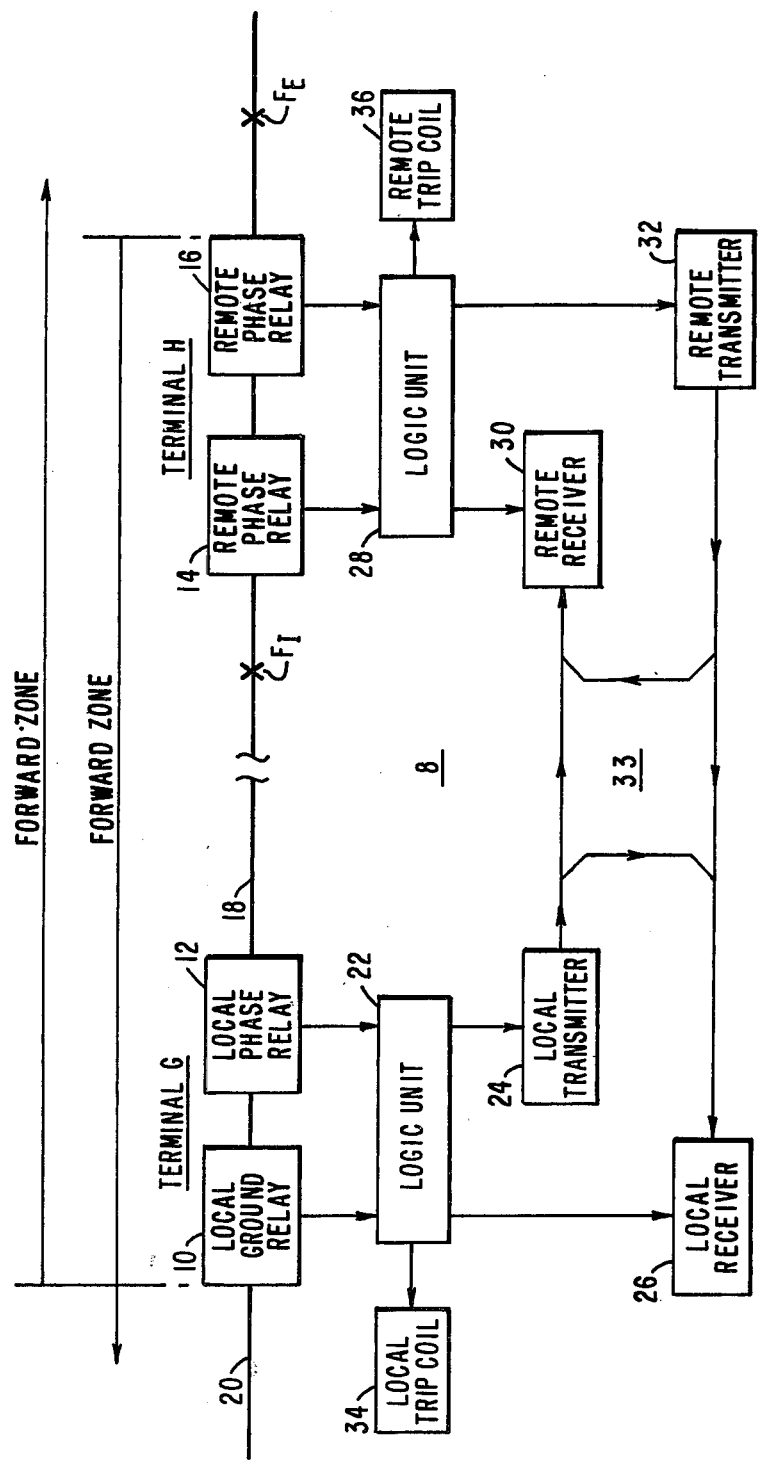
FIG. 1 is a block diagram of a directional comparison blocking relaying system constructed according to the teachings of the present invention.

Turning to FIG. 1, there is illustrated a directional comparison blocking relay system 8 constructed according to the teachings of the present invention. FIG. 1 illustrates the reach zones for each protective relay of the directional comparison blocking relay system 8 located on an electrical power line 20. A local ground relay 10 and a local phase relay 12 are located at a local terminal G of a protected line segment 18. As illustrated by the arrows on FIG. 1, both the local ground relay 10 and the local phase relay 12 are forward reaching distance relays. (Note that the forward zone refers to approximately 150% of the protected line segment 18, and the reverse zone refers to that portion of the electrical power line 20 behind the local terminal G or beyond the remote terminal H.) A remote phase relay 14 and a remote ground relay 16 are located at a remote terminal H of the protected line segment 18. The local ground relay 10 and the local phase relay 12 monitor that segment of the protected line segment 18 from the local terminal G beyond the remote terminal H. Similarly, the remote phase relay 14 and the remote ground relay 16 monitor that portion of the protected line segment 18 from the remote terminal H beyond the local terminal G. The reach for each of the relays illustrated in FIG. 1 is indicated thereon by arrows.

A logic unit 22 is responsive to a signal from the local ground relay 10 and a signal from the local phase relay 12. An input terminal of a local trip coil 34 is connected to a first output terminal of the logic unit 22. A local transmitter 24 is responsive to a signal from a second output terminal of the logic unit 22. A local receiver 26 receives a remote blocking carrier signal from a remote transmitter 32, located at the remote terminal H, and provides a signal to the logic unit 22. The local receiver 26 also receives a local blocking carrier signal from a local transmitter 24. The local and remote blocking carrier signals can be of the on/off or frequency-shift carrier type.

At the remote terminal H, a logic unit 28 is responsive to a signal from the remote phase relay 14 and a signal from the remote ground relay 16. An input terminal of a remote trip coil 36 is connected to a first output terminal of the logic unit 28. The remote transmitter 32 is responsive to a signal from a second output terminal of the logic unit 28. A remote receiver 30 receives the local blocking carrier signal from the local transmitter 24 and provides a signal to the logic unit 28. The remote receiver 30 is also responsive to the remote blocking carrier signal produced by the remote transmitter 32. The local transmitter 24 communicates with the remote receiver 30 via a communications channel 33; the remote transmitter 32 communicates with the local receiver 26 via the communications channel 33.

For an external fault at a point $F_E$ in FIG. 1, the directional comparison blocking relay system 8 operates as follows. Depending on whether the fault is a phase-to-phase fault or a phase-to-ground fault, the local phase relay 12 or the local ground relay 10 (respectively) sees the fault and provides a signal to the logic unit 22. The logic unit 22 activates the local transmitter 24 to transmit the local blocking carrier signal. The local blocking carrier signal is received by the local receiver 26 and the remote receiver 30. In response to the local blocking carrier signal, the logic unit 22 blocks the local trip coil 34 for the duration of the local blocking carrier signal. In response to the local blocking carrier signal, the remote receiver 30 provides a signal to the logic unit 28, which indicates receipt of the local blocking carrier signal and blocks tripping of the remote trip coil 36. Also, at the remote terminal H, neither the remote phase relay 14 nor the remote ground relay 16 see the external fault. Under these conditions, i.e., where the fault is not seen from the remote terminal H and the remote receiver 30 receives the local blocking carrier signal, the logic unit 28 keys the remote transmitter 32 to send the remote blocking carrier signal to the local receiver 26 and the remote receiver 30. When the remote receiver 30 receives the remote blocking carrier signal, the logic unit 28 blocks tripping of the remote trip coil 36. When the local receiver 26 receives the remote blocking carrier signal, the logic unit 22 blocks the local trip coil 34.

After several milliseconds, the local transmitter 24 ceases transmission of the local blocking carrier signal. This is of no consequence, however, because the remote receiver 30 and the local receiver 26 are still receiving the remote blocking carrier signal, and therefore blocking of the local and remote trip coils 34 and 36 continues. The duration of transmission of the remote blocking carrier signal is much longer than the duration of the local blocking carrier signal. Thus, after the local transmitter 24 stops transmitting the local carrier blocking signal, the remote blocking carrier signal blocks tripping at both the local terminal G and the remote terminal H.

For an internal fault at a location $F_I$, the fault is seen from the local terminal G and the remote terminal H. Depending on whether the fault is a phase-to-phase fault or a phase-to-ground fault, the local ground relay 10 or the local phase relay 12, and the remote ground relay 16 or the remote phase relay 14 see the fault. Therefore, the logic unit 22 keys the local transmitter 24 to transmit the local blocking carrier signal, and the logic unit 28 keys the remote transmitter 32 to transmit the remote blocking carrier signal. After several milliseconds, the local transmitter 24 and the remote transmitter 32 cease blocking carrier transmission. Now the logic unit 22 energizes the local trip coil 34 because the local ground relay 10 or the local phase relay 12 sees the fault and neither the local nor remote blocking carrier signal is received. Also, the logic unit 28 energizes the remote trip coil 36 because the remote ground relay 16 or the remote phase relay 14 sees the fault and neither the local nor remote blocking carrier signal is received.

Figure 2:
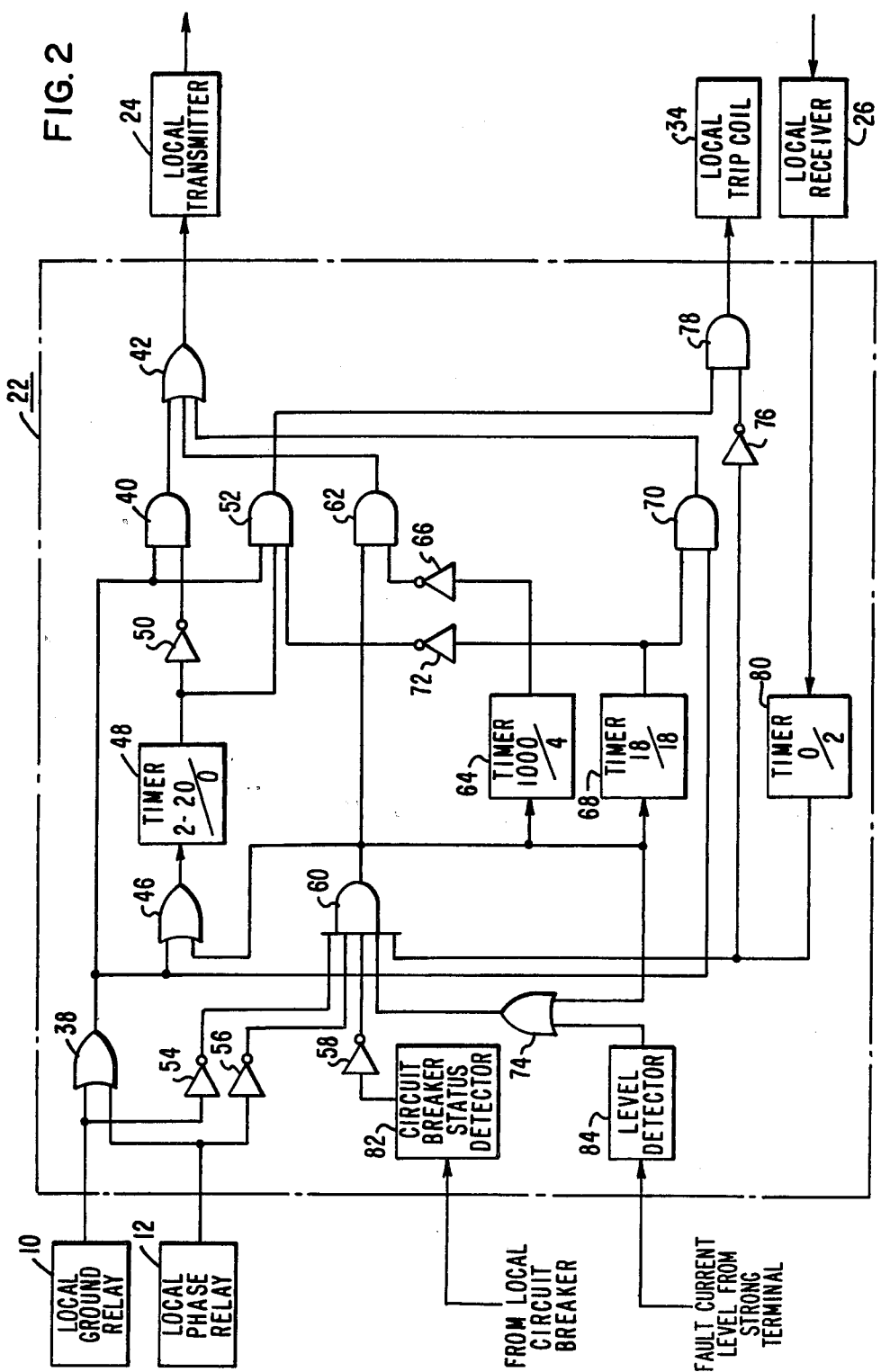
FIG. 2 is a schematic diagram of the logic unit of FIG. 1 constructed according to the teachings of present invention.

FIG. 2 is a schematic diagram of a logic unit 22 constructed according to the teachings of the present invention. The logic unit 28 is identical in structure and function to the logic unit 22 and therefore will not be discussed further. Turning to FIG. 2, a first input terminal of an OR gate 38 is responsive to a fault signal from the local ground relay 10 when the local ground relay 10 detects a fault in the forward zone from the local terminal G (see FIG. 1). A second input terminal of the OR gate 38 is responsive to a fault signal from the local phase relay 12 when the local phase relay 12 detects a fault. An input terminal of an inverting gate 54 is responsive to the fault signal from the local ground relay 10, and an input terminal of an inverting gate 56 is responsive to the fault signal from the local phase relay 12.

A circuit breaker status detector 82 is responsive to a signal from a local circuit breaker (not shown). An output terminal of the circuit breaker status detector 82 is connected to an input terminal of an inverting gate 58. A level detector 84 is responsive to a fault current level signal from the strong terminal of the electrical power line 20. An output terminal of the level detector 84 is connected to a first input terminal of an OR gate 74. A timer 80 is responsive to a signal from the local receiver 26. In one embodiment of the present invention the timer 80 has a pick-up time of 0 ms and a drop-out time of 2 ms. A first input terminal of an AND gate 60 is connected to an output terminal of the inverting gate 54; a second input terminal of the AND gate 60 is connected to an output terminal of the inverting gate 56; a third input terminal of the AND gate 60 is connected to an output terminal of the inverting gate 58; a fourth input terminal of the AND gate 60 is connected to an output terminal of the OR gate 74; a fifth input terminal of the AND gate 60 is connected to an output terminal of the timer 80. A second input terminal of the OR 74 is connected to an output terminal of the AND gate 60.

A first terminal of an OR gate 46 is connected to the output terminal of the OR gate 38; a second input terminal of the OR gate 46 is connected to the output terminal of the AND gate 60. An output terminal of the OR gate 46 is connected to an input terminal of a timer 48. In one embodiment of the present invention, the timer 48 has a variable pick-up time of from 2 through 20 ms and a drop-out time of 0 ms. The setting of the pick-up time of the timer 48 is based on the round-trip communications delay time between the remote terminal H and the local terminal G. An input terminal of an inverting gate 50 is connected to an output terminal of the timer 48. A first input terminal of an AND gate 40 is connected to the output terminal of the OR gate 38, and a second input terminal of the AND gate 40 is connected to an output terminal of the inverting gate 50.

An input terminal of a timer 64 is connected to the output terminal of the AND gate 60. In one embodiment, the timer 64 has a pick-up time of 1000 ms and a drop-out time of 4 ms. An input terminal of an inverting gate 66 is connected to an output terminal of the timer 64. A first input terminal of an AND gate 62 is connected to the output terminal of the AND gate 60; a second input terminal of the AND gate 62 is connected to an output terminal of the inverting gate 66.

An input terminal of a timer 68 is connected to the output terminal of the AND gate 60. In one embodiment, the timer 68 has a pick-up time of 18 ms and a drop-out time of 18 ms. A first input terminal of an AND gate 70 is connected to an output terminal of the timer 68, and a second input terminal of the AND gate 70 is connected to the output terminal of the OR gate 38. A first input terminal of an OR gate 42 is connected to an output terminal of the AND gate 40; a second input terminal of the OR gate 42 is connected to an output terminal of the AND gate 62; a third input terminal of the OR gate 42 is connected to an output terminal of the AND gate 70. An output terminal of the OR gate 42 is connected to an input terminal of the local transmitter 24.

A first input terminal of an AND gate 52 is connected to the output terminal of the OR gate 38; a second input terminal of the AND gate 52 is connected to the output terminal of the timer 48; a third input terminal of the AND gate 52 is connected to the output terminal of the timer 68 via an inverting gate 72. A first input terminal of an AND gate 78 is connected to an output terminal of the AND gate 52, and a second input terminal of the AND gate 78 is connected to the output terminal of the timer 80 via an inverting gate 76. An output terminal of the AND gate 78 is connected to the input terminal of the local trip coil 34.

For an internal phase-to-phase fault, the logic unit 22 functions as follows. Due to the fault signal from the local phase relay 12, the output terminal of the OR gate 38 is high, thereby enabling AND gate 40 and activating the timer 48 via the OR gate 46. Since the timer 48 has a non-zero pick-up time, the output terminal thereof is low when the input terminal thereof goes high. The low signal at the output terminal of the timer 48 is inverted by the inverting gate 50 to turn on the AND gate 40. When the output terminal of the AND gate 40 is high the OR gate 42 turns on and keys the local transmitter 24. When keyed, the local transmitter 24 transmits the local blocking carrier signal to the local and remote receivers 26 and 30 (see FIG. 1). The pick-up time of the timer 48 is variable from 2 to 20 ms to control the transmission duration of the local blocking carrier signal. After the pick-up time of the timer 48 has elapsed, the output terminal thereof goes high, the AND gate 40 is disabled, and the local transmitter 24 turns off.

Note that during an internal fault the AND gate 60 is disabled by the low state of the second input terminal thereof. This low state is produced by inverting the fault signal from the local phase relay 12 in the inverting gate 56. Because the output terminal of the AND gate 60 is low, the output terminal of the timer 68 is also low, and the third input terminal of the AND gate 52 is high due to the action of the inverting gate 72. The high state at the output terminal of the OR gate 38 causes the first input terminal of the AND gate 52 to also go high. After the pick-up time of the timer 48 has elapsed, the second input terminal of the AND gate 52 goes high (and as previously discussed, the local blocking carrier signal turns off). Now with all three input terminals high, the output terminal of the AND gate 52 goes high, enabling the AND gate 78, which controls the local trip coil 34.

Recall that for an internal fault the local receiver 26 receives the remote blocking carrier signal from the remote transmitter 32. The timer 80 is activated by both the local and remote blocking carrier signals, and due to the inverting gate 76 the AND gate 78 is off when the timer 80 is active. A timer in the logic unit 28 (not shown in FIG. 2) similar to the timer 48 in the logic unit 22, eventually turns off the remote blocking carrier signal. Two milliseconds (plus channel delay time) thereafter the timer 80 goes low, and the second input terminal of the AND gate 78 goes high due to the inverting gate 76. Since the first input terminal of the AND gate 78 is high, as discussed above, when the second input terminal thereof goes high the AND gate 78 energizes the local trip coil, which trips the local circuit breaker. To summarize, the conditions causing the local circuit breaker to trip are not receiving the remote block carrier signal at the local receiver 26, and the local phase relay 12 seeing the fault.

Internal ground faults activate the local ground relay 10 and cause the output terminal of the OR gate 38 to go high. The function of the other logic elements in the logic unit 22 is therefore identical to the situation where the local phase relay 12 detects the internal fault. Also, the logic unit 28 functions in an identical manner at the remote terminal H.

Because the local receiver 26 and the remote receiver 30 are each responsive to both the local and remote blocking carrier signals, it is possible that carrier signal cancellation could occur when the remote and local blocking carrier signals arrive out of phase at the local receiver 26 or the remote receiver 30. To avoid this problem, in one embodiment of the present invention the local and remote blocking carrier signals were chosen 100 Hz apart and the local receiver 26 and the remote receiver 30 configured to respond to the same center frequency.

Assuming an external fault behind the local terminal G on the electrical power line 20, operation of the logic unit 22 is as follows. Neither the local ground relay 10 nor the local phase relay 12 detect the fault and therefore the fault signal from each is low. The output terminal of the OR gate 38 is also low. The inverting gates 54 and 56 invert the fault signals from the local ground relay 10 and the local phase relay 12. For an external fault behind the local terminal G, the inverting gates 54 and 56 provide a high signal to the first and second input terminals of the AND gate 60. The circuit breaker status detector 82 and the level detector 84 will be discussed in more detail subsequently, for present purposes assume that the signal produced by the circuit breaker status detector 82 and the level detector 84 are such that the third and fourth input terminals of the AND gate 60 are also high.

At the remote terminal H the remote phase relay 14 or the remote ground relay 16 detects the fault behind the local terminal G and through the logic unit 28, keys the remote transmitter 32 on. The remote transmitter 32 is keyed on by the logic unit 28 in a manner identical to that described above for internal faults. When the local receiver 26 receives the remote blocking carrier signal from the remote transmitter 32, the timer 80 is activated and the fifth input terminal of the AND gate 60 goes high. The output terminal of the AND gate 60 now goes high to activate the following: the timer 48 via the OR gate 46, the timer 64, and the timer 68. In one embodiment, the timer 64 has a 1000 ms pick-up time, and until the 1000 ms time has elapsed the low signal at the output terminal of the timer 64 is inverted by the inverting gate 66 to enable the AND gate 62. Since the first input terminal of the AND gate 62 is also high due to the high state of the output terminal of the AND gate 60, the output terminal of the AND gate 62 is high and triggers the local transmitter 24 ON via the OR gate 42. The local transmitter 24 transmits the local blocking carrier signal to the remote terminal H for 1000 ms (the pick-up time of the timer 64).

At the remote terminal H the remote receiver 30 is responsive to both the local and remote blocking carrier signals. The logic unit 28 includes a timer similar to the timer 80, an inverting gate similar to the inverting gate 76, and an AND gate similar to the AND gate 78. Upon receipt of the local and/or remote blocking carrier signal, these three components in the logic unit 28 prevent tripping of the remote trip coil 38 for the external fault. After 1000 ms, the output terminal of the timer 64 goes high, and through the action of the inverting gate 66 transmission of the local blocking carrier signal is stopped. At this time, if either the remote phase relay 14 or the remote ground relay 16 still defects the fault, tripping occurs at the remote terminal H. The 1000 ms duration should, however, be sufficient to allow other appropriate protective relays and circuit breakers to detect and clear the external fault. Therefore, the remote phase relay 14 or the remote ground relay 16 should not see the fault after the 1000 ms has elapsed.

The directional comparison blocking relay system 8 also includes a transient blocking feature to prevent false tripping due to a power reversal in the protected line segment 18 following sequential clearing of a fault on a parallel line. Before the power reversal the local ground relay 10 and the local phase relay 12 do not see the fault and the local transmitter 24 is transmitting the local blocking carrier signal through the action of the timer 64, as discussed above for an external fault. Transmission of the local blocking carrier signal blocks tripping at the remote terminal H. When the power reversal occurs the local phase relay 12 detects the fault and turns off the AND gate 60 via the inverting gate 56. This turns off the local transmitter 24 to stop transmission of the local blocking carrier signal. When the output terminal of the OR gate 38 goes high, due to the fault signal from the local phase relay 12, the second input terminal of the AND gate 70 is enabled. Also, if the local ground relay 10 and the local phase relay 12 did not see a fault for at least 18 ms prior to the power reversal, the timer 68 is high. Since both of the input signals thereto are high, the output terminal of the AND gate 70 is high; this turns on the local transmitter 24 via the OR gate 42. The local blocking carrier signal is transmitted for 18 ms, which is long enough for the remote phase relay 14 at the remote terminal H to reset and begin transmission of the remote blocking carrier signal to the local terminal G. Receipt of the remote blocking carrier signal at the local terminal G blocks tripping of the local trip coil 34.

The level detector 84 and the OR gate 74 are included in the logic unit 22 to ensure proper operation in the presence of a weak source on the electrical power line 20 (see FIG. 1). The level detector 84 and the OR gate 74 are included in the logic unit 22 only when the logic unit 22 is installed at a weak feed terminal. (If the logic unit 22 is installed at a strong feed terminal, the level detector 84 and the OR gate 74 are unnecessary, and the AND gate 60 has only four input terminals.) The level detector 84 is responsive to a fault current level signal from the strong terminal of the protected line segment 18. If the fault current level signal exceeds the predetermined setting of the level detector 84, the AND gate 60 is enabled through the OR gate 74. This allows the AND gate 60 to cause transmission of the local blocking carrier signal if the fault is external as discussed above. Note that the output terminal of the AND gate 60 (at a weak feed terminal) is connected to the input terminal of the OR gate 74 to make certain that the local carrier blocking signal is transmitted for the full 1000 ms of the timer 64 even though the level detector 84 may reset if the fault is cleared in another line section. This is compatible with the operation at the strong terminal where the blocking signal for an external fault continues for the full 1000 ms.

The directional comparison blocking relay system 8 also includes the circuit breaker status detector 82. The circuit breaker status detector 82 is responsive to a signal from the local circuit breaker (not shown). The output terminal of the circuit breaker status detector 82 goes high when the circuit breaker is open. Through the action of the inverting gate 58, the AND gate 60 is disabled when the local circuit breaker is open, thereby preventing transmission of the local carrier blocking signal when the local circuit breaker is open.

It should be noted that for an internal fault the local phase relay 12 and the remote phase relay 14 (or the local ground relay 10 and the remote ground relay 16) will likely not see the fault at precisely the same time, and therefore will not operate simultaneously. For the example, if the remote phase relay 14 senses the internal fault first, the remote blocking carrier signal is transmitted to the local terminal G to block tripping there. The remote blocking carrier signal also activates the timer 48 at the local terminal G, via the AND gate 60. When the local phase relay 12 or the local ground relay 10 finally senses the fault, the timer 48 continues to run through the OR gate 46. Allowing activation of the timer 48 when the remote blocking carrier signal is received or when the local phase relay 12 (or local ground relay 10) sees the fault provides faster tripping. The tripping is faster by an amount of time equal to the time lapse between the AND gate 60 going high and either the local ground relay 10 or the local phase relay 12 seeing the fault.

Having now discussed the directional comparison blocking system 8 in detail, the advantages thereof are more readily seen. The directional comparison blocking system 8 retains the advantage of the prior art directional comparison blocking system whereby a carrier signal is transmitted only to block tripping. This is accomplished in the directional comparison blocking relay system 8 with only two relays at each terminal of the protected line segment 18. In the prior art four relays are required at each line terminal.

What is claimed is:

1. A protective relay system for opening a local circuit interrupter at the local terminal and a remote circuit interrupter at the remote terminal of a protected line segment of an ac electrical power network when a fault occurs on the protected line segment, said protective relay system comprising:

local fault detector means for determining the direction to the fault;

remote fault detector means for determining the direction to the fault;

local logic means for transmitting a local blocking signal to the remote terminal when the fault is in the forward direction from the local terminal, wherein said local blocking signal is transmitted for a first predetermined duration;

remote logic means for transmitting a remote blocking signal to the local terminal when the fault is in the forward direction from the remote terminal, wherein said local blocking signal is transmitted for said first predetermined duration;

wherein said local logic means is responsive to said remote blocking signal, for transmitting said local blocking signal for a second predetermined duration when said remote blocking signal is received and the fault is in the reverse direction from the local terminal, and wherein said local logic means is responsive to said local blocking signal;

wherein said remote logic means is responsive to said local blocking signal, for transmitting said remote blocking signal for said second predetermined duration when said local blocking signal is received and the fault is in the reverse direction from the remote terminal, and wherein said remote logic means is responsive to said remote blocking signal;

local trip means for tripping the local circuit interrupter when the fault is in the forward direction from the local terminal and said local and remote blocking signals are not received by said local logic means;

and remote trip means for tripping the remote circuit interrupter when the fault is in the forward direction from the remote terminal and said local and remote blocking signals are not received by said remote logic means.

2. The protective relay system of claim 1 wherein the local fault detector means includes a forward-reaching phase distance relay.

3. The protective relay system of claim 1 wherein the local fault detector means includes a forward-reaching ground distance relay.

4. The protective relay system of claim 1 wherein the remote fault detector means includes a forward-reaching phase distance relay.

5. The protective relay system of claim 1 wherein the remote fault detector means includes a forward-reaching ground distance relay.

6. The protective relay system of claim 1 wherein the local logic means includes:

means for producing a local fault signal when the fault is in the forward direction from the local terminal;

first OR gate means having a first input terminal responsive to said local fault signal, a second input terminal, and an output terminal;

first timer means having an input terminal connected to said output terminal of said first OR gate means, and said first timer means having an output terminal and predetermined pick-up and drop-out times;

first inverter means having an input terminal connected to said output terminal of said first timer means, and said first inverter means having an output terminal;

first AND gate means having a first input terminal connected to said output terminal of said first inverter means and a second input terminal responsive to said local fault signal, said first AND gate means having an output terminal;

receiver means for receiving the local and remote blocking signals and for producing a received signal;

second timer means responsive to said received signal, said second timer means having an output terminal and predetermined pick-up and drop-out times;

second inverter means responsive to said local fault signal, said second inverter means having an output terminal;

second AND gate means having a first input terminal connected to said output terminal of said second inverter means, and having a second input terminal connected to said output terminal of said second timer means, said second AND gate means having an output terminal;

wherein said second input terminal of said first OR gate means is connected to said output terminal of said second AND gate means;

third timer means having an input terminal connected to said output terminal of said second AND gate means, said third timer means having an output terminal and predetermined pick-up and drop-out times;

third inverter means having an input terminal connected to said output terminal of said third timer means, said third inverter means having an output terminal;

third AND gate means having a first input terminal connected to said output terminal of said second AND gate means, and having a second input terminal connected to said output terminal of said third inverter means, said third AND gate means having an output terminal;

second OR gate means having a first input terminal connected to said output terminal of said first AND gate means, and having a second input terminal connected to said output terminal of said third AND gate means, for producing a transmit signal;

transmitter means responsive to said transmit signal for transmitting said local blocking signal, wherein the transmission duration of the local blocking signal is controlled by said first and third timer means;

fourth AND gate means having a first input terminal responsive to said local fault signal, and having a second input terminal connected to said output terminal of said first timer means, for producing a local trip enable signal;

fourth inverter means having an input terminal connected to said output terminal of said second timer means, said fourth inverter means having an output terminal;

fifth AND gate means having a first input terminal responsive to said local trip enable signal, and having a second input terminal connected to said output terminal of said fourth inverter means, for producing a local trip signal;

wherein the local trip means is responsive to said local trip signal for tripping the local circuit interrupter.

7. The protective relay system of claim 6 wherein the pick-up time of the first timer means is variable at 2-20 ms.

8. The protective relay system of claim 6 wherein the drop-out time of the first timer means is 0 seconds.

9. The protective relay system of claim 6 wherein the pick-up time of the second timer means is 0 seconds.

10. The protective relay system of claim 6 wherein the drop-out time of the second timer means is 2 ms.

11. The protective relay system of claim 6 wherein the pick-up time of the third timer means is 1000 ms.

12. The protective relay system of claim 6 wherein the drop-out time of the third timer means is 4 ms.

13. The protective relay system of claim 6 wherein the local logic means includes
fourth timer means having an input terminal connected to the output terminal of the second AND gate means, said fourth timer means having an output terminal and having predetermined pick-up and drop-out times;
fifth inverter means having an input terminal connected to said output terminal of said fourth timer means, said fifth inverter means having an output terminal;
wherein the fourth AND gate means includes a third input terminal connected to said output terminal of said fifth inverter means;
sixth AND gate means having a first input terminal connected to said output terminal of said fourth timer means and a second input terminal responsive to the local fault signal, said sixth AND gate means having an output terminal;
wherein the second OR gate means includes a third input terminal connected to said output terminal of said sixth AND gate means.

14. The protective relay system of claim 6 wherein the local logic means includes:
means for producing a predetermined fault current reference signal;
level detector means responsive to the fault current at the remote terminal for producing a detection signal when the fault current at the remote terminal exceeds said predetermined fault current reference signal;
third OR gate means having a first input terminal connected to the output terminal of the second AND gate means, and a second input terminal responsive to said detection signal, said third OR gate means having an output terminal;
wherein the second AND gate means includes a third input terminal connected to said output terminal of said third OR gate means.

15. The protective relay system of claim 6 wherein the local logic means includes:
means for determining the status of the local circuit interrupter and for producing a status signal in response thereto, wherein said status signal is in a first state when the local circuit interrupter is open and wherein said status signal is in a second state when the local circuit interrupter is closed;
wherein the second AND gate means includes a fourth input terminal responsive to said status signal for disabling the second AND gate means when the local circuit interrupter is open.

16. The protective relay system of claim 1 wherein the local and remote blocking carrier signals include on/off carrier signals.

17. The protective relay system of claim 1 wherein the local and remote blocking carrier signals include frequency-shift carrier signals.

* * * * *